US011286397B2

(12) United States Patent
Bethouart et al.

(10) Patent No.: US 11,286,397 B2
(45) Date of Patent: Mar. 29, 2022

(54) ALCOHOL-BASED DRY-ERASABLE INK

(71) Applicant: SOCIÉTÉ BIC, Clichy (FR)

(72) Inventors: Carine Bethouart, Neufchatel-Hardelot (FR); Philippe Lefebvre, Wimereux (FR); Christelle Debrauwer, Saint Germain sur Morin (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 16/606,133

(22) PCT Filed: Apr. 16, 2018

(86) PCT No.: PCT/FR2018/050953
§ 371 (c)(1),
(2) Date: Oct. 17, 2019

(87) PCT Pub. No.: WO2018/193197
PCT Pub. Date: Oct. 25, 2018

(65) Prior Publication Data
US 2020/0048484 A1  Feb. 13, 2020

(30) Foreign Application Priority Data
Apr. 18, 2017 (FR) ...................................... 1753341

(51) Int. Cl.
*C09D 11/17* (2014.01)
*B43K 1/12* (2006.01)

(52) U.S. Cl.
CPC ................ *C09D 11/17* (2013.01); *B43K 1/12* (2013.01)

(58) Field of Classification Search
USPC ........................................... 106/31.01, 31.13
See application file for complete search history.

(56) References Cited

U.S. PATENT DOCUMENTS

| | | | | |
|---|---|---|---|---|
| 4,256,494 A * | 3/1981 | Yamamoto | ............. | C09D 11/16 106/31.62 |
| 4,578,117 A * | 3/1986 | Nakanishi | ............. | C09D 11/16 106/31.32 |
| 5,316,574 A * | 5/1994 | Fujita | ..................... | C09D 11/16 106/31.64 |
| 5,318,617 A * | 6/1994 | Nagasawa | ............. | C09D 11/17 106/31.64 |
| 5,324,764 A * | 6/1994 | Fujita | ..................... | C09D 11/16 106/31.64 |
| 2010/0063186 A1 | 3/2010 | Onyenemezu | | |
| 2020/0048483 A1* | 2/2020 | Bethouart | ............. | C09D 11/16 |

FOREIGN PATENT DOCUMENTS

| | | | |
|---|---|---|---|
| CA | 1029144 A | * | 4/1978 |
| DE | 3044036 | | 5/1982 |
| EP | 0551913 | | 7/1993 |
| FR | 2212408 | | 7/1974 |
| JP | H0428777 | | 1/1992 |
| JP | H069917 | | 1/1994 |
| JP | 2010-209169 | | 9/2010 |
| JP | 2010209169 A | * | 9/2010 |
| WO | WO 2008/006542 A1 | * | 1/2008 |
| WO | WO 2018/193196 A1 | * | 10/2018 |
| WO | WO 2020/064652 A1 | * | 4/2020 |

OTHER PUBLICATIONS

English translation of JPH 06/9917, Jan. 1994; 7 pages.*
English translation of JPH 04/28777, Jan. 1992; 5 pages.*
English translation of JP 2010/209169, Sep. 2010; 7 pages.*
English translation of DE 3044036, May 1982; 11 pages.*
International Search Report dated Jun. 15, 2018, in International Application No. PCT/FR2018/050952 (5 pages).
International Search Report dated Jun. 6, 2018, in International Application No. PCT/FR2018/050953 (5 pages).

* cited by examiner

*Primary Examiner* — James E Mcdonough
(74) *Attorney, Agent, or Firm* — Bookoff McAndrews, PLLC

(57) ABSTRACT

An alcohol-based dry-erasable ink for a writing instrument including, as separation agent, a mixture of glycerol, glycol and pentaerythritol ester.

20 Claims, No Drawings

ALCOHOL-BASED DRY-ERASABLE INK

CROSS REFERENCE TO RELATED APPLICATIONS

This application is a National Stage application of International Application No. PCT/FR2018/050953, filed on Apr. 16, 2018, now published as WO/2018/193197 and which claims priority to French Application No. 1753341, filed Apr. 18, 2017.

FIELD

The present disclosure relates to an alcohol-based dry-erasable ink for a writing instrument.

DESCRIPTION OF RELATED ART

Dry-erasable inks are designed to be used on impermeable surfaces such as whiteboards, e.g. Velleda®. In most cases, these are pigmented inks with a low viscosity (between 5 and 10 cP at 20° C.) for use particularly in markers provided with fibrous tips. They dry quickly and are easily erasable by rubbing after drying, e.g. using a dry cloth or a brush.

One of the important properties of this type of ink is precisely their erasure properties over time. The user can erase a whiteboard even after several days, weeks or even months.

These erasure properties may differ according to the surface material of whiteboards: polypropylene, PVC, gloss, enamel or melamine, for example.

Patent application JP2010-209169 explains that this property can be improved by adding a neopentyl polyol fatty acid ester, the fatty acid being a $C_{4-20}$ fatty acid, such as pentaerythritol fatty tetra-acid esters, for example.

However, the current applicants surprisingly noticed that the use of a pentaerythritol ester as a separation agent in alcohol-based dry-erasable inks allowed inks to be obtained having good long-term erasure properties, but only for certain surfaces (polypropylene, PVC and enamel) and that conversely the erasure properties just after the ink was applied, i.e. still wet ink, were insignificant.

The applicants also discovered that in order to improve these erasure performances both in the long-term on any board surface and in the short term (at T0), i.e. still wet ink, it was necessary to use pentaerythritol ester in association with glycerol and a glycol, particularly triethylene glycol, because these three compounds present a synergy if used together.

Application EP0551913 explains that pentaerythritol esters like pentaerythritol tetraoctanoate must be used as a separation agent in association with another separation agent to improve the erasure properties. However, this other separation agent is a polyoxyethylene-polyoxypropylene block copolymer.

Application JPH0428777 in turn explains that the pentaerythritol fatty tetra-acid ester must be used as a separation agent in association with two other separation agents to improve the erasure properties. However, these two other separation agents are an aliphatic monocarboxylic acid ester with at least 8 carbon atoms and an aliphatic monohydric alcohol with at least 8 carbon atoms and an alkylene polyoxyethylene phenyl ether phosphoric acid ester.

DETAILED DESCRIPTION

The present disclosure also relates to an alcohol-based dry-erasable ink for a writing instrument comprising, as separation agent, a mixture of glycerol, triethylene glycol and pentaerythritol ester.

In the sense of the present disclosure, "dry-erasable ink" is understood as an ink that can be dry-erased on the support, even after drying, simply by rubbing, without the use of water or another solvent, e.g. using a dry cloth.

The dry-erasable ink according to the present disclosure thus comprises, as separation agent, a mixture of glycerol, glycol and pentaerythritol ester, advantageously a mixture of glycerol, triethylene glycol and pentaerythritol ester.

The pentaerythritol ester may be a pentaerythritol fatty tetra-acid ester, particularly $C_4$-$C_{20}$ fatty tetra-acid. Advantageously it is an ester of the following general formula (I)

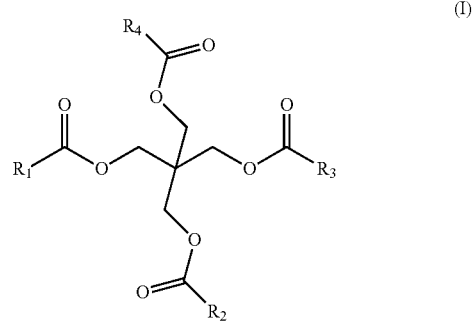

(I)

wherein $R_1$, $R_2$, $R_3$ and $R_4$ represent, independently of one another, a $C_4$-$C_{20}$ alkyl group, for example a $C_6$-$C_{12}$ alkyl group or a $C_8$-$C_{10}$ alkyl group.

In the sense of the present disclosure, "$C_4$-$C_{20}$ alkyl group" is understood as any linear or ramified saturated alkyl group comprising between 4 and 20 carbon atoms. These include, for example, butyl, pentyl, hexyl, heptyl, ethylhexyl, octyl, decyl, nonyl, undecyl and dodecyl.

As a pentaerythritol ester according to the disclosure we can mention, for example, pentaerythrityl tetraethylhexanoate, pentaerythrityl tetracaprylate/tetracaprate, pentaerythrityl tetracaprylate, pentaerythrityl tetracaprate and their mixtures.

Advantageously, it is pentaerythrityl tetraethylhexanoate.

These esters are commercially available from the company STEARINERIE DUBOIS in particular.

The pentaerythritol ester content of the ink is between 0.1% and 25%, in some examples between 1% and 20%, or between 5% and 8%, and in other examples between 5% and 7% by weight in relation to the total weight of the ink.

In a particular embodiment the glycerol content of the ink is between 0.1% and 10%, in some examples between 0.5% and 7%, or between 1% and 5%, and in other examples between 2% and 4% by weight in relation to the total weight of the ink.

The glycol that can be used as a separation agent in the dry-erasable ink may be, for example, butylene glycol, propylene glycol, hexylene glycol, a polyoxyalkylene glycol such as triethylene glycol, dipropylene glycol or tripropylene glycol.

Advantageously, it is a polyoxyalkylene glycol such as triethylene glycol, dipropylene glycol or tripropylene glycol.

Even more the glycol is triethylene glycol.

In a further embodiment the glycol content, particularly triethylene glycol, of the ink according to the disclosure is between 0.1% and 5%, in some examples between 0.3% and 4%, and in other examples between 0.5% and 2% by weight in relation to the total weight of the ink.

The ink according to the present disclosure is alcohol based. It thus comprises as a principal solvent (i.e. as solvent present in the largest quantity) an alcohol. The alcohol is an alcohol of the general formula $R_4$—OH in which $R_4$ represents a $C_1$-$C_6$ alkyl group, particularly a $C_1$-$C_4$ alkyl group. The alcohol is chosen from among ethanol, propanol (e.g. isopropanol and/or n-propanol), butanol (e.g. isobutanol, n-butanol, sec-butanol and/or tert-butanol) and their mixtures, for example, from among ethanol, propanol and their mixtures, and in other examples from among n-propanol, ethanol and their mixtures.

In particular, the alcohol content of the ink is between 40% and 90%, in some examples between 60% and 87%, in other examples between 75 and 85% by weight in relation to the total weight of the ink.

The alcohol-based ink may comprise a further solvent such as an organic solvent that will particularly evaporate quickly and thus having a low boiling point.

The alcohol-based ink according to the present disclosure does not contain a further solvent.

The dry-erasable ink according to the disclosure furthermore comprises a pigment, a resin and possibly additives.

The pigment allows color to be added to the ink and is chosen from among pigments that are well known by a person skilled in the art. These pigments include Pigment Blue 15:6 and Pigment Violet 37, for example, which allow the color blue to be obtained.

The pigment content of the ink is between 0.1% and 10%, in some examples between 0.5% and 5%, in other examples between 1% and 3%, or between 1% and 2% by weight in relation to the total weight of the ink.

The resin present in the ink allows the appropriate viscosity for writing and adherence to the impermeable writing surface to be added. The resin will furthermore create a film with the pigment after evaporation of the alcohol.

The resin is alcohol-soluble. The resin may be a vinyl resin, an acrylic resin, a styrene-acrylic resin, a maleic styrene-acid copolymer resin, a maleic rosin-acid copolymer resin, a phenol resin, a cellulosic resin, a ketone resin or a mixture of these. The resin is a vinyl resin such as a vinyl chloride copolymer, polyvinyl butyral, polyvinyl pyrrolidone, polyvinyl acetate, vinyl-pyrrolidone and vinyl-acetate copolymer or a mixture of these. In particular, the resin is polyvinyl butyral.

In a particular embodiment, the resin content of the ink is between 0.1% and 10%, in some examples between 0.5% and 5%, in other examples between 0.7% and 3%, or between 1% and 2% by weight in relation to the total weight of the ink.

The dry-erasable ink may furthermore comprise additives such as surfactants (e.g. anionic, cationic or non-ionic surfactants such as laureth-3, phosphated alcohol ethoxylate or their mixtures), manufacturing additives (e.g. esters such as triglycerides, particularly C7, C8 and/or C10 triglycerides), denaturing agents (e.g. esters such as diethylhexyl adipate), drying retarders (e.g. esters or paraffins such as sorbitan stearate) and their mixtures.

The additive content of the ink is between 0.1% and 10%, in some examples between 0.5% and 5%, in other examples between 0.7% and 4%, or between 2% and 3% by weight in relation to the total weight of the ink.

In a particular embodiment, the compound does not compromise polyoxyethylene-polyoxypropylene block copolymer.

In fact, contrary to the indications in application EP0551913, the presence of such a copolymer is not necessary in the ink to obtain good erasure properties.

In a particular embodiment, the compound does not comprise alkylene polyoxyethylene phenyl ether phosphoric acid ester or aliphatic monocarboxylic acid ester with at least 8 carbon atoms and aliphatic monohydric alcohol with at least 8 carbon atoms or a mixture of these esters.

In fact, contrary to the indications in application JPH0428777, the presence of these two esters is not necessary in the ink to obtain good erasure properties.

The dry-erasable ink according to the disclosure is thus provided for a writing instrument, such as a pen or marker, for example, a marker, particularly a marker with a fibrous tip.

The marker may have a round-tip or beveled tip, for example.

The dry-erasable ink according to the disclosure is provided for use on a non-porous surface, particularly a smooth surface, such as a whiteboard, for example. This writing board may have a surface of varying composition. It may be an enamel board, a glossy board, a board covered with a polypropylene film, a board covered with a PVC film or a board covered with melamine.

The present disclosure furthermore relates to a writing instrument comprising a dry-erasable ink according to the invention.

The writing instrument is a pen or marker, particularly a marker, more particularly one with a fibrous tip.

The marker may have a round-tip or beveled tip, for example.

The present disclosure will be understood after reading the example the follows, provided as a non-limiting example.

Example 1

The short-term (wet or dry) and long-term erasure properties are tested for different dry-erasable ink compounds: an ink compound according to the disclosure comprising as separation agent a mixture of glycerol, triethylene glycol and pentaerythritol ester (example 1), a comparative ink compound comprising as separation agent only a pentaerythritol ester (comp. example 1), a comparative ink compound comprising as separation agent a mixture of pentaerythritol ester and glycerol (comp. example 2), a comparative ink compound comprising as separation agent a mixture of pentaerythritol ester and triethylene glycol (comp. example 3) and a comparative ink compound comprising as separation agent a mixture of triethylene glycol and glycerol (comp. example 4). The composition of these different blue inks is indicated in table 1 below.

TABLE 1 composition of inks in % by weight.

|  | Ex 1 | Comp. Ex 1 | Comp. Ex 2 | Comp. Ex 3 | Comp. Ex 4 |
| --- | --- | --- | --- | --- | --- |
| ETHANOL | 69.84 | 73.80 | 69.84 | 69.84 | 69.84 |
| PROPANOL-1 | 14.00 | 14.00 | 14.00 | 14.00 | 14.00 |
| PIGMENT BLUE 15:6 | 1.47 | 1.47 | 1.47 | 1.47 | 1.47 |
| PIGMENT VIOLET 37 | 0.39 | 0.39 | 0.39 | 0.39 | 0.39 |
| POLYVINYL BUTYRAL | 1.76 | 1.76 | 1.76 | 1.76 | 1.76 |
| TRIGLYCERIDE C7 | 0.73 | 0.73 | 0.73 | 0.73 | 0.73 |
| TRIGLYCERIDE C8/C10 |  |  |  |  | 1.00 |
| PENTAERYTHRITYL TETRAETHYL-HEXANOATE | 6.00 | 6.00 | 6.00 | 6.00 |  |

TABLE 1-continued composition of inks in % by weight.

|  | Ex 1 | Comp. Ex 1 | Comp. Ex 2 | Comp. Ex 3 | Comp. Ex 4 |
|---|---|---|---|---|---|
| GLYCEROL | 3.00 |  | 4.00 |  | 3.00 |
| TRITHYLENE GLYCOL | 1.00 |  |  | 4.00 | 1.00 |
| DIETHYLHEXYL ADIPATE | 0.71 | 0.75 | 0.71 | 0.71 | 0.71 |
| DIISODECYL ADIPATE |  |  |  |  | 5.00 |
| SORBITAN STEARATE | 0.80 | 0.80 | 0.80 | 0.80 | 0.80 |
| LAURETH-3 | 0.15 | 0.15 | 0.15 | 0.15 | 0.15 |
| PHOSPHATED ALCOHOL ETHOXYLATE | 0.15 | 0.15 | 0.15 | 0.15 | 0.15 |
| TOTAL | 100.0 | 100.0 | 100.0 | 100.0 | 100.0 |

The details of the tests performed to compare the erasability at T0 and over time between the inks are as follows:

Erasability at T0:

This test evaluates the erasability of an ink deposit when it is still wet and when it is dry, as well as the erasability incidence on the support.

The test is performed in a room with air conditioning and controlled humidity: 23° C. (+/−2° C.)/50% relative humidity (+/−5%)

The test is performed on two different surfaces: Velleda® slate (polypropylene film) and a whiteboard with a melamine surface.

Before beginning the tests, the investigator must clean the different supports with ethanol, leave them to dry for 5 minutes, wash his hands and dry them.

Three tests are performed:

Erasability of the wet mark (before cloth): this test allows the investigator to verify that the erasure is clean when the consumer makes a mistake, for example, and wants to erase his marking immediately without waiting the drying time of the film on the support.

The procedure involves making, on each of the surfaces to be tested, a smear with the dimensions 20×80 mm and immediately wiping the smear with 2 fingers in a circular movement until the smear has completely disappeared.

This step is repeated 5 times in a row as quickly as possible and by making the smear in exactly the same spot (without cleaning the support between wipings) and a score is given based on what remains visible on the support according to a scale indicated in table 2 below, ranging from 0 to 10.

TABLE 2 score based on observation

| | Observation | | | | |
|---|---|---|---|---|---|
| | No mark | Light mark | Moderate mark | Large mark | Very large mark |
| Score | 10 | 7.5 | 5 | 2.5 | 0 |

Erasability of the wet mark (after cloth):

If a mark remains, the support is cleaned with absorbent paper (3 times at most) and a score is also given based on what remains visible on the support with the same scale above, ranging from 0 to 10, from table 2.

Erasability of the dry mark: habitual consumer use

The procedure involves making, on each of the surfaces to be tested, a smear with the dimensions 20×80 mm and letting it dry for 5 minutes. The smear is then cleaned with an absorbent paper in a back-and-forth motion until the smear has completely disappeared.

This is repeated 3 times in a row making the smear in exactly the same spot (without cleaning the support between wipings) and a score is given based on what remains visible on the support with the same scale above, ranging from 0 to 10, from table 2.

Erasability Over Time:

This test evaluates how long a dry-erasable ink deposit adheres to a given surface before it can no longer be erased. The test is performed in a room with air conditioning and controlled humidity: 23° C. (+/−2° C.)/50% relative humidity (+/−5%).

The test is performed on different surfaces:

Velleda® slate (polypropylene film)

a PCVC film a whiteboard with a melamine surface purchased on the European market a whiteboard with a melamine surface from the USA a whiteboard with a glossy surface (purchased on the European market)

a whiteboard with an enamel surface (purchased on the European market)

Before beginning the tests, the investigator must clean the different supports with ethanol and leave them to dry for 5 minutes.

The procedure involves vertically making as many smears (with the dimension 10×10 mm) as aging intervals as desired on each of the surfaces to be tested. After each aging interval and for each support, the smear is cleaned with a clean absorbent paper in a quick, fluid back-and-forth motion without pressing too hard.

The test is stopped once the ink adheres to the support or can no longer be erased at all.

In standard procedure this test is performed until 3 months, but for the ink according to the disclosure (ex 1), the test is extended beyond 3 months.

The erasure result, expressed in time, corresponds to the aging interval preceding the adherence of the ink or the non-erasure of the ink. The results obtained with the different inks are presented in table 3 below.

TABLE 3

Results of the erasure tests

| Tests | | Surface | Ex 1 | Comp Ex 1 | Comp Ex 2 | Comp Ex 3 | Comp Ex 4 |
|---|---|---|---|---|---|---|---|
| Erasability at T0 (score) | Wet mark before cloth | Velleda ® | 7.5 | 2.5 | 5 | 5 | 7.5 |
| | | Melamine | 5 | 0 | 2.5 | 2.5 | 5 |
| | Wet mark after cloth | Velleda ® | 10 | 10 | 10 | 10 | 10 |
| | | Melamine | 10 | 10 | 10 | 10 | 10 |
| | Dry mark | Velleda ® | 10 | 10 | 10 | 10 | 10 |
| | | Melamine | 10 | 10 | 10 | 10 | 10 |
| Erasability over time (in time) | | Velleda ® | Between 7 and 8 months | 3 months OK | 3 months OK | 3 months OK | Between 1 and 2 weeks |
| | | PVC film | >12 months | 3 months OK | 3 months OK | 3 months OK | Between 2 and 3 months |
| | | Melamine (EU) | >12 months | 3 months OK | <1 day | <1 day | 3 months OK |
| | | Melamine (USA) | >12 months | Between 1 and 2 months | <1 day | <1 day | Between 1 and 2 months |
| | | Gloss | Between 3 and 4 months | Between 1 and 3 days | Between 1 and 3 days | Between 1 and 3 days | Between 1 and 3 days |
| | | Enamel | >12 months | 3 months OK | Between 1 and 2 weeks | 3 months OK | 3 months OK |

Only the ink according to the disclosure (Ex 1) allows good erasability properties to be obtained at T0, particularly when the ink is still wet, and over time, regardless of the surface on which the mark is made.

The use of the 3 separation agents, pentaerythritol ester, glycerol and triethylene glycol therefore has synergic properties on the erasure properties.

The invention claimed is:

1. An alcohol-based dry-erasable ink for a writing instrument comprising, as separation agent, a mixture of glycerol, glycol and a pentaerythritol ester, wherein the pentaerythritol ester is pentaerythrityl tetraethylhexanoate.

2. The dry-erasable ink according to claim 1, wherein the pentaerythritol ester content is between 0.1 and 25% by weight in relation to a total weight of the ink.

3. The dry-erasable ink according to claim 1, wherein the glycol content is between 0.1% and 5% by weight in relation to a total weight of the ink.

4. The dry-erasable ink according to claim 1, wherein the glycerol content is between 0.1% and 10% by weight in relation to a total weight of the ink.

5. The dry-erasable ink according to claim 1, wherein the alcohol is an alcohol including $R_4$—OH in which $R_4$ represents a $C_1$-$C_6$ alkyl group selected from the group consisting of ethanol, propanol and mixtures thereof.

6. The dry-erasable ink according to claim 1, wherein the alcohol content is between 40% and 90% by weight in relation to a total weight of the ink.

7. The dry-erasable ink according to claim 1, further including a pigment, a resin and additives.

8. The dry-erasable ink according to claim 7, wherein the additive is selected from the group consisting of surfactants, manufacturing additives, denaturing agents, marker tip drying retarders and mixtures thereof.

9. The dry-erasable ink according to claim 7, wherein the pigment content is between 0.1% and 10% by weight in relation to a total weight of the ink.

10. The dry-erasable ink according to claim 7, wherein the resin content is between 0.1% and 10% by weight in relation to a total weight of the ink.

11. The dry-erasable ink according to claim 7, wherein the additive content is between 0.1% and 10% by weight in relation to a total weight of the ink.

12. A writing instrument including a fibrous tip and comprising a dry-erasable ink according to claim 1.

13. An alcohol-based dry-erasable ink for a writing instrument comprising a separation agent, the separation agent consisting essentially of glycerol, glycol, and a pentaerythritol ester, wherein the pentaerythritol ester includes pentaerythrityl tetraethylhexanoate, pentaerythrityl tetracaprylate, pentaerythrityl tetracaprate, or mixtures thereof.

14. The dry-erasable ink according to claim 13, wherein the glycol is triethylene glycol.

15. The dry-erasable ink according to claim 13, wherein the pentaerythritol ester content is between 0.1 and 25% by weight in relation to a total weight of the ink.

16. The dry-erasable ink according to claim 13, wherein the glycol content is between 0.1% and 5% by weight in relation to a total weight of the ink.

17. An alcohol-based dry-erasable ink for a writing instrument comprising a separation agent, the separation agent comprising a mixture of glycerol, glycol, and a pentaerythritol ester,
wherein the pentaerythritol ester includes pentaerythrityl tetraethylhexanoate, pentaerythrityl tetracaprylate, pentaerythrityl tetracaprate, or mixtures thereof.

18. The dry-erasable ink according to claim 17, wherein the glycerol content is between 0.1% and 10% by weight in relation to a total weight of the ink.

19. The dry-erasable ink according to claim 17, wherein the glycol content is between 0.1% and 5% by weight in relation to a total weight of the ink.

20. The dry-erasable ink according to claim 17, wherein the pentaerythritol ester content is between 0.1 and 25% by weight in relation to a total weight of the ink.

* * * * *